(12) United States Patent
Kelly et al.

(10) Patent No.: US 7,645,930 B2
(45) Date of Patent: Jan. 12, 2010

(54) THERMAL OPTIMIZATION OF A SOLAR PHOTOVOLTAIC POWERED ELECTROLYZER SYSTEM

(75) Inventors: Nelson A. Kelly, Sterling Heights, MI (US); Thomas L. Gibson, Utica, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 329 days.

(21) Appl. No.: 11/691,564

(22) Filed: Mar. 27, 2007

(65) Prior Publication Data

US 2008/0236646 A1  Oct. 2, 2008

(51) Int. Cl.
*H01L 31/042* (2006.01)
*B60L 8/00* (2006.01)
*B60K 16/00* (2006.01)

(52) U.S. Cl. .......... 136/244; 126/271.1; 60/641.8; 205/334; 205/687

(58) Field of Classification Search ........ 205/687, 205/334; 136/244; 60/641.8; 126/271.1
See application file for complete search history.

(56) References Cited

U.S. PATENT DOCUMENTS

| 4,206,745 A * | 6/1980 | Gilgen ............... 126/271.1 |
| 2005/0044853 A1 | 3/2005 | Yoshino |
| 2006/0065302 A1 | 3/2006 | Gibson et al. |

FOREIGN PATENT DOCUMENTS

| DE | 100 27 549 A1 | 4/2002 |
| JP | 2000054174 | 2/2000 |

OTHER PUBLICATIONS

Machine translation of JP2000054174.*
European Search Report, May 7, 2008, Application No. EP08003931, 3 pages.

* cited by examiner

*Primary Examiner*—Roy King
*Assistant Examiner*—Rebecca Lee

(57) ABSTRACT

One embodiment of the invention includes a process comprising transmitting electrical power produced by a PV array to an electrolyzer and transferring heat from the PV array to the electrolyzer. The resulting process produces renewable hydrogen from solar energy at a lower cost per kg.

7 Claims, 5 Drawing Sheets

THERMAL OPTIMIZATION OF A SOLAR PHOTOVOLTAIC POWERED ELECTROLYZER SYSTEM

TECHNICAL FIELD

The field to which the disclosure generally relates includes solar powered electrolyzers.

BACKGROUND

Certain hydrogen generation devices use electricity to produce hydrogen (and oxygen) by electrolysis of water in an electrolyzer. The hydrogen generated is stored for use as a fuel, useable in fuel cells, internal combustion engines, and home-based hydrogen fueling systems. The oxygen may be vented to the atmosphere Electrolyzers may be powered by solar energy. Solar hydrogen generation by a photovoltaic-electrolyzer (PV-electrolyzer) is a renewable and environmentally beneficial energy source. Converting U.S. fuel supplies to renewable energy sources is essential for sustainable transportation, sustainable economic growth, reducing greenhouse gas emissions, and national energy security by replacing polluting fossil fuels imported from unstable regions overseas. However, the development of solar hydrogen generation by photovoltaic-electrolyzer (PV-electrolyzer) systems has been delayed by low efficiencies (2-6%) and high costs (>\$11/kg $H_2$).

PV modules are rated in terms of the power produced under standard test conditions (STC). The STC are 1000 Watts/$m^2$ irradiance with a solar spectrum corresponding to a solar angle through the atmosphere of 41.8 degrees with respect to the earth's surface (a so-called air mass of 1.5) and with a module temperature of 25° C. The irradiance, which is often referred to as "one sun", approximates real-world peak sunshine at about noon on a cloud-free summer day in the continental United States. However, under real-world one-sun irradiance conditions, PV modules seldom stay at such a low temperature. This occurs for three reasons: 1) typically the highest irradiance occurs on days and periods during the day that are hot, 2) the modules are dark blue (sometimes even black), and the dark color absorbs light which leads to heating, and 3) most of the solar irradiance is converted to heat with less than 20% converted to electrical energy. Thus, on the sunniest days when PV modules produce the most power, their temperature is often well above that used in determining their power rating.

Increasing the hydrogen generation efficiency of a PV-electrolyzer system can reduce the cost of the hydrogen produced.

SUMMARY OF EXEMPLARY EMBODIMENTS OF THE INVENTION

One embodiment of the invention includes a process comprising transmitting electrical power produced by a PV array to an electrolyzer and transferring heat from the PV array to the electrolyzer, the transferring heat comprising circulating a first fluid.

Other exemplary embodiments of the invention will become apparent from the detailed description provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings.

DETAILED DESCRIPTION OF EXEMPLARY EMBODIMENTS

The following descriptions of the embodiments are merely exemplary in nature and are in no way intended to limit the invention, its application, or uses.

Figure 1:
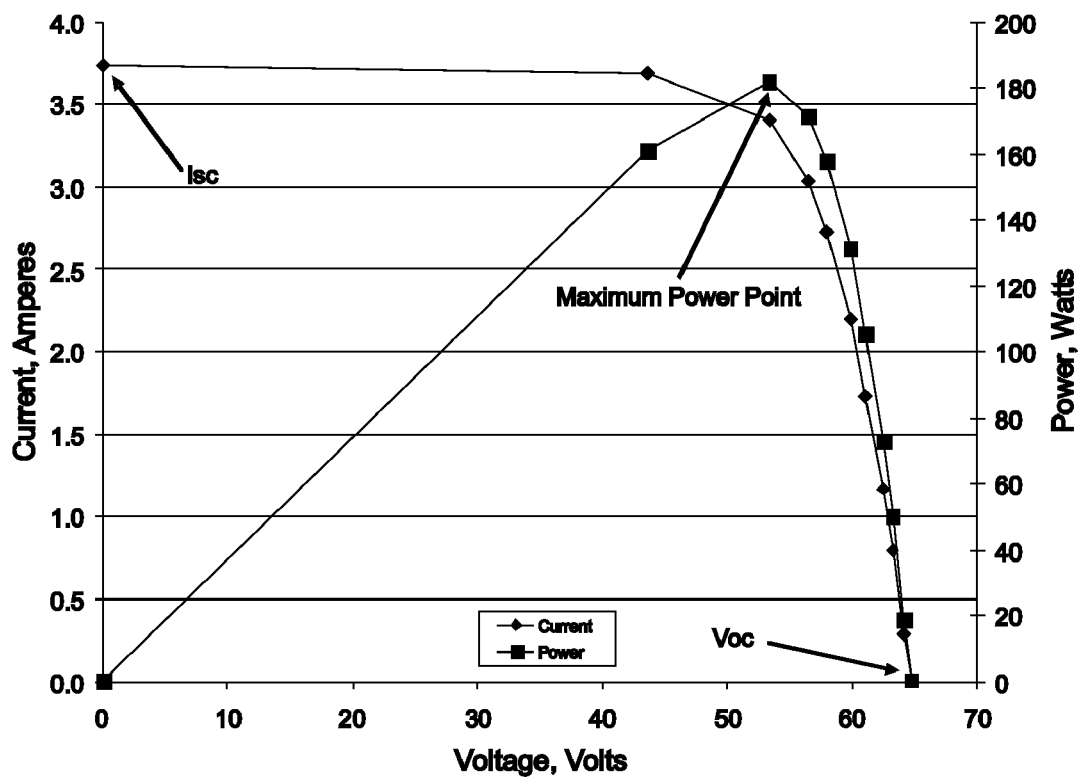
FIG. 1 illustrates the current-voltage and current-power curves for a solar module measured outdoors on a sunny day.

FIG. 1 illustrates the current-voltage (I-V) and power-voltage curves measured for a Sanyo HIP-190BA3 module, available from the Sanyo Energy Corp., on a sunny day in Warren, Mich. The module was pointed at the sun and the I-V curve was obtained using a DC electronic load (Hewlett Packard 6060A) to scan from the open circuit voltage ($V_{oc}$) to the short circuit current ($I_{sc}$). The solar irradiance was measured with a United Detector Technology crystalline silicon photodiode (UDT model 10 DP/SV) hooked to a Fluke Model 179 multimeter to measure the milli-ampere current from the photodiode. The UDT current output at 1000 W/$m^2$ of irradiance was calibrated by the National Renewable Energy laboratory. The module temperature was measured using a VWR catalog #77776-730 (Batavia, Ill.) electronic thermometer attached to the back of the module with duct tape. For the data shown in FIG. 1 the module temperature varied from 40.1 to 41.1° C. and the solar irradiance varied from 978 to 981 W/$m^2$. The maximum power for these temperature and irradiance conditions was 181.7 watts, which was measured at a voltage of 53.3 V and a current of 3.41 amperes.

Figure 2:
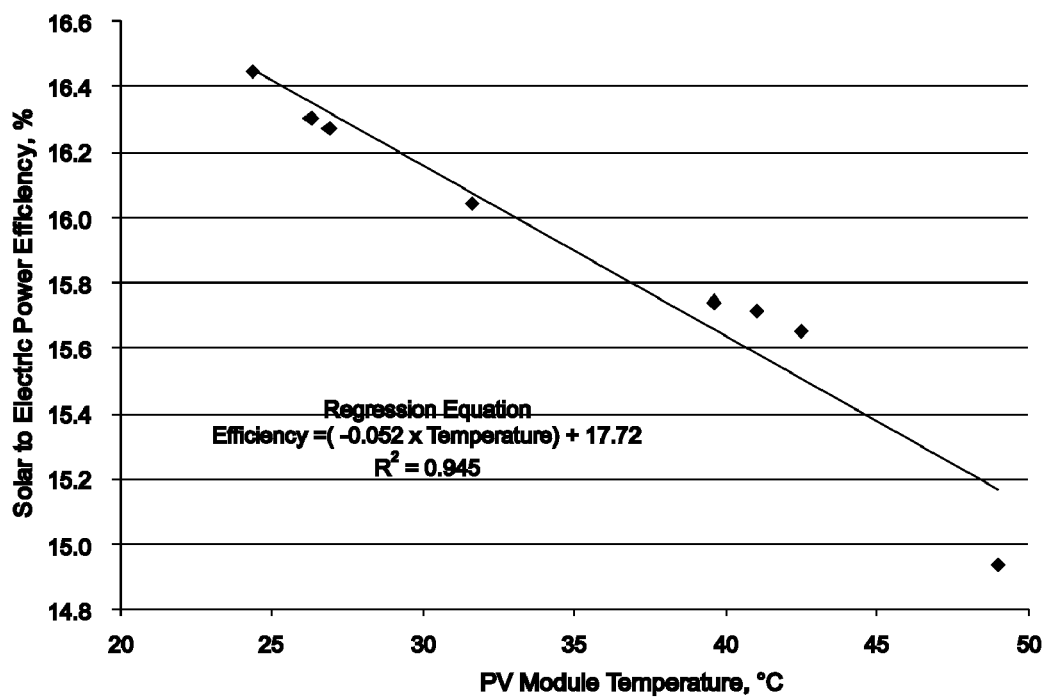
FIG. 2 illustrates the temperature dependence of the efficiency of a PV module in converting solar power to electric power.

FIG. 2 illustrates the temperature dependence of the solar to electric power efficiency of a PV module. The PV module tested was a Sanyo HIP-190BA3 module, and the module was cooled with water as a series of I-V curves were obtained. The maximum power output was thus obtained over the temperature range shown in FIG. 2. As the module temperature increases, the solar to electric power efficiency decreases. Higher temperatures primarily lower the power output of PV modules and arrays of modules.

Figure 3:
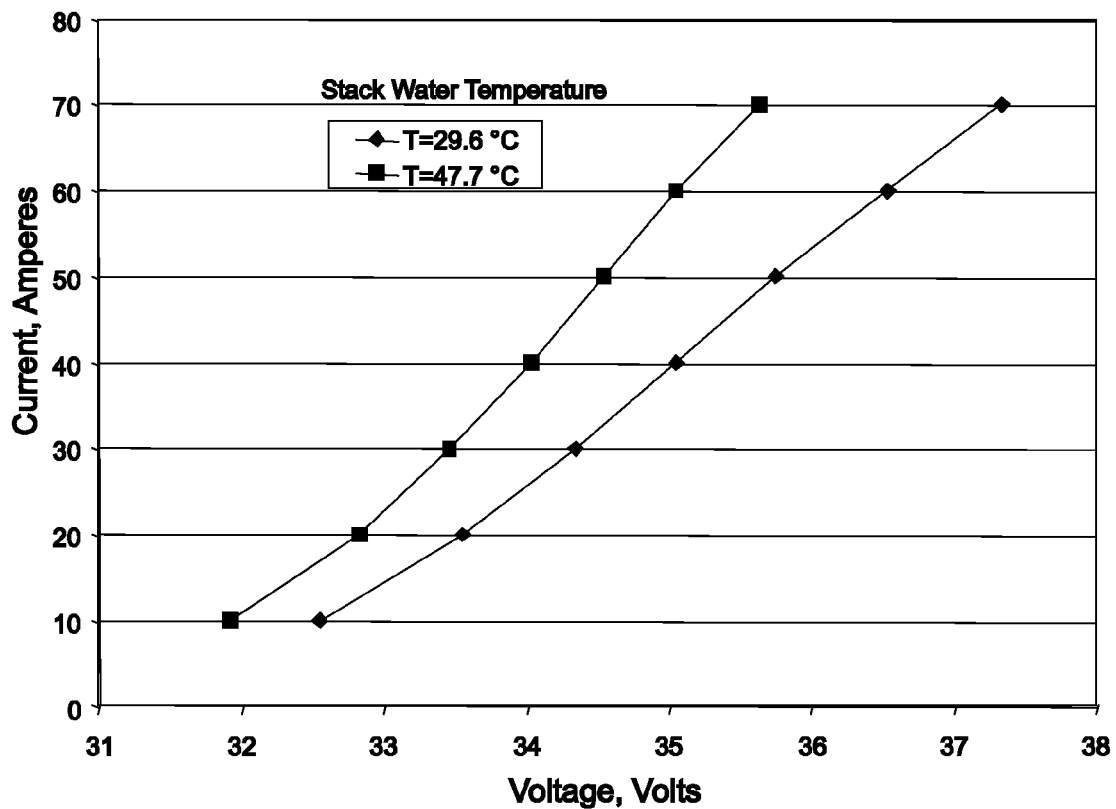
FIG. 3 illustrates the current-voltage characteristics of a PEM electrolyzer at two different temperatures.

By contrast, an electrolyzer runs more efficiently at higher temperatures. FIG. 3 shows I-V scans of a proton exchange membrane (PEM) electrolyzer obtained at two different temperatures. The electrolyzer that we tested was obtained from a HOGEN Model 40 generator (Proton Energy Systems, Rocky Hill, Conn.). The electrolyzer was removed from the HOGEN 40 and was operated using two 1000 watt Hewlett Packard DC power supplies wired in parallel (Models 6012B and 6032A). Together, the power supplies could operate the stack up to a current of over 70 amperes. The electrolyzer had two electrical connections and four gas/liquid connections. Water was circulated through the hydrogen and oxygen sides of the stack using small pumps (VWR catalog # 23609-170, Batavia, Ill.). The stack temperature and circulation water temperature were measured with electronic thermometers (VWR catalog # 77776-730, Batavia, Ill.). The data in FIG. 3 was obtained by scanning I-V curves for the electrolyzer using the power supplies to vary the voltage and current. The temperature of the electrolyzer increased during a scan since the electrolyzer is less than 100% efficient at converting electrical energy into chemical energy (hydrogen and oxygen from water splitting). A plot of the I-V data from scans at two different stack water temperatures is shown in FIG. 3. At the higher temperature the electrolyzer reached a higher current (and thus a higher hydrogen production) at a lower voltage (higher efficiency).

The electrolyzer efficiency (electrical to hydrogen production efficiency) can be calculated from the equation:

Efficiency=(# of cells in series×1.23×100%)/$V_{oper}$

For our electrolyzer the number of cells in series was 20. The value 1.23 is the theoretical water splitting voltage under standard conditions, and $V_{oper}$ is the operating voltage of the electrolyzer for a given current.

Figure 4:
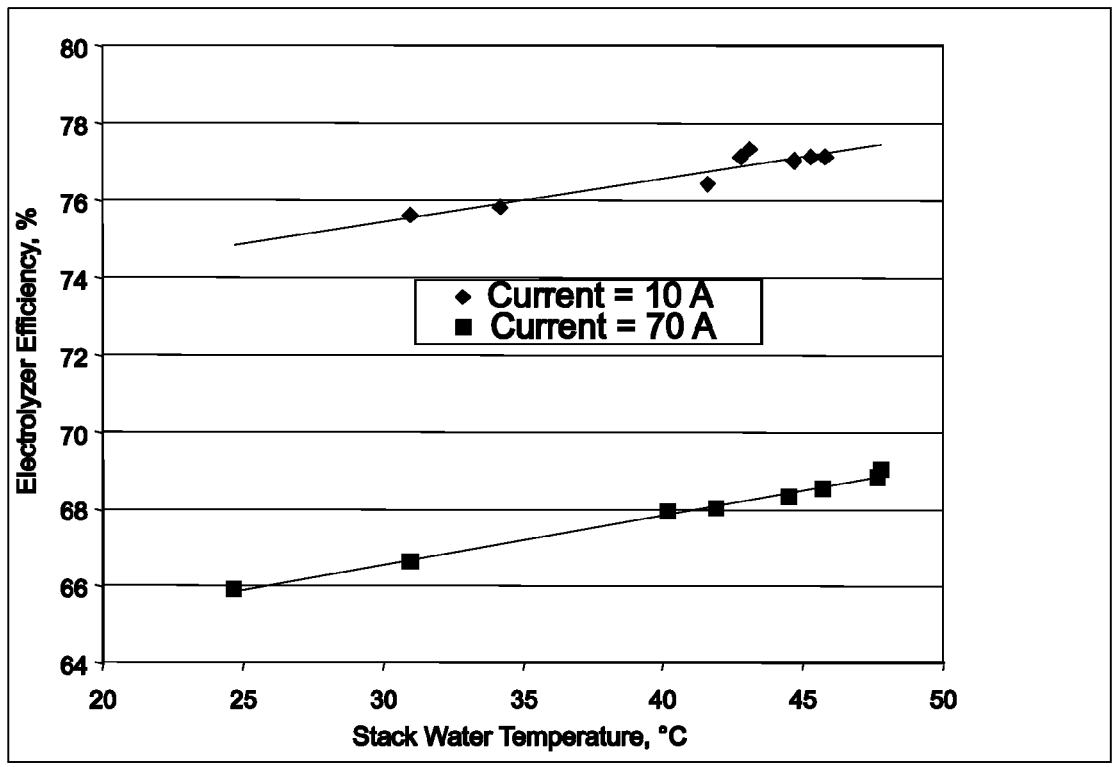
FIG. 4 illustrates the temperature dependence of the efficiency of a PEM electrolyzer.

FIG. 4 shows the electrolyzer efficiency for two current settings as a function of the electrolyzer stack water temperature. The electrolyzer becomes more efficient as it "warms up" for either current setting, i.e., as the stack water temperature of a PEM electrolyzer increases, the electrolyzer efficiency generally increases. Based on the data in FIG. 4 it appears that one may run the electrolyzer at low current and high temperature to get the greatest efficiency. However, at low current one would get low hydrogen production. For example, from FIG. 4, for a given temperature, one gets seven times the hydrogen (70 A vs. 10 A) while losing less than 10% efficiency at the higher current. Higher temperatures are good for increasing electrolyzer efficiency, but there is a limit. For a PEM electrolyzer the temperature must be kept below about 80° C., since the "electrolyte" is a Nafion membrane (a polyfluorosulfonic) acid, and it is more quickly degraded at higher temperatures.

Figure 5:
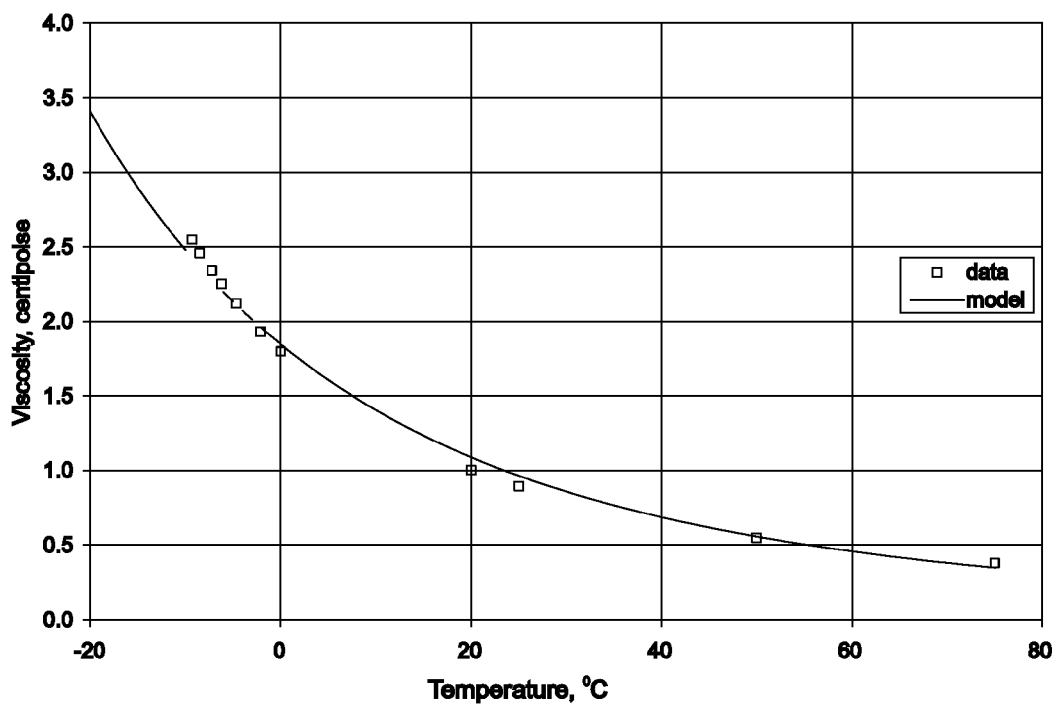
FIG. 5 illustrates the temperature dependence of the viscosity of water.
Figure 6:
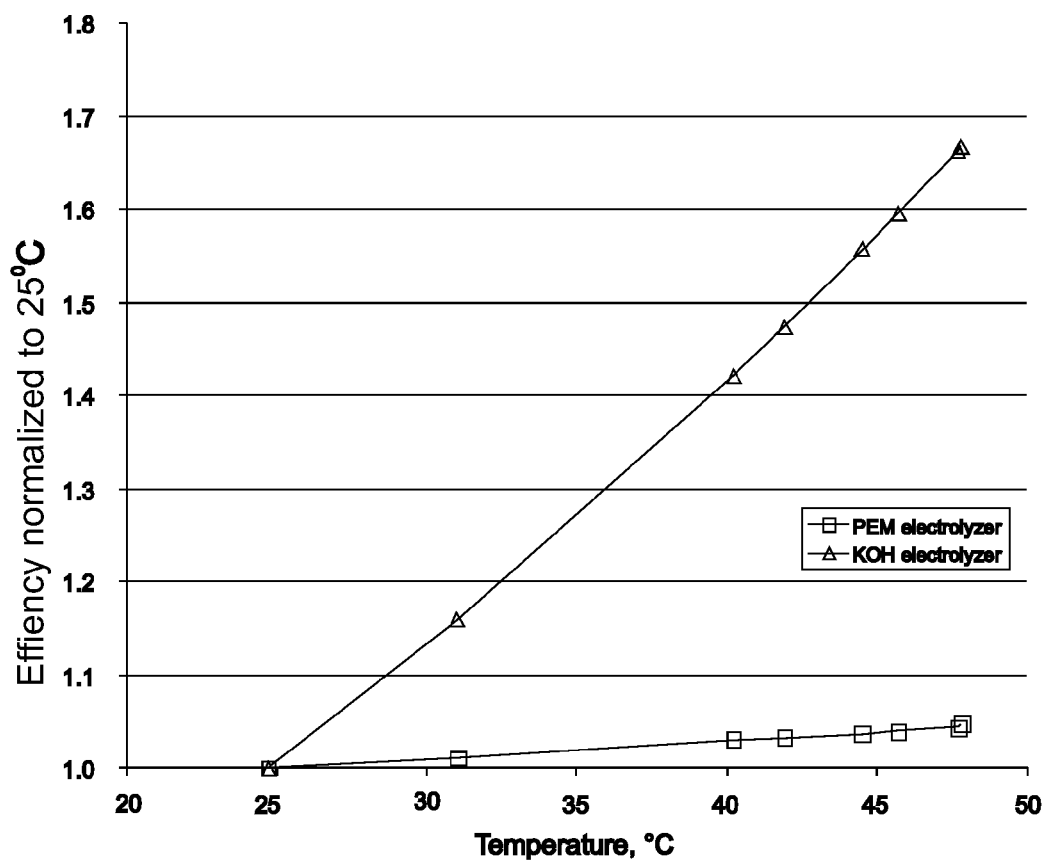
FIG. 6 illustrates the temperature dependence of the efficiency of a PEM electrolyzer and an aqueous KOH-based electrolyzer.

Recently, Avalence LLC (Milford, Conn.) introduced a high-pressure electrolyzer that uses an aqueous solution of KOH as the electrolyte. High-pressure hydrogen production via direct electrolysis can be a key advancement in the development of distributed hydrogen generation since it eliminates the expensive, bulky, noisy, and inefficient hydrogen compression using a mechanical pump. Avalence electrolyzers show a very strong temperature dependence due to the temperature dependence of the KOH conductivity. In KOH-based electrolyzers, potassium and hydroxyl ions conduct the current in solution, and the ion mobilities and conductances increase with temperature. The temperature coefficients for conductance are similar for all ions in water. The temperature coefficient for ionic conductance in water is approximately equal to the temperature coefficient for the viscosity. FIG. 5 shows a plot of the viscosity of water over a range of temperatures of interest for the Avalence electrolyzer. This plot was obtained from data in the Handbook of Chemistry and Physics (The Chemical Rubber Co., Cleveland Ohio) and "Physical Chemistry, Third Edition" (Daniels and Alberty, John Wiley and Sons, 1966). The model fit uses an exponential function with the inverse of the temperature in the exponential term (Arrhenius-type equation for kinetic rate coefficients). This fit to viscosity-temperature data is recommended in standard texts on physical chemistry, e.g. "Physical Chemistry, Third Edition". From FIG. 5, the viscosity at 20° C. is 1.09 centipoise; at 60° C. it is 0.458 centipoise Due to the strong temperature dependence of aqueous solution conductance on temperature, as illustrated in FIG. 5, KOH-based electrolyzers are expected to have a much greater dependence of efficiency on temperature than PEM electrolyzers. FIG. 6 illustrates this greater temperature dependence of the efficiency of aqueous KOH-based electrolyzers versus aqueous PEM-based electrolyzers. Heating the electrolyzer to take advantage of the higher efficiency at higher temperatures could involve circulating a heated liquid over the surface of the electrolyzer cells, or it could involve circulating the aqueous electrolyte through a heat exchanger (KOH-based electrolyzer), or the electrolyzer may include plates including passages through which a fluid may circulate to heat the electrolyzer (PEM-based electrolyzer). For an aqueous KOH-based electrolyzer, the electrolyte conductivity for a given voltage will vary with temperature in the same manner as the electrolyte viscosity. The efficiency of an aqueous KOH-based electrolyzer will increase with temperature in proportion to the conductivity decrease. Thus, the data in FIG. 5 and the equation for the model fit to that data can be used to predict the relative improvements in electrolyzer efficiency as a function of temperature. The resulting electrolyzer efficiency measurements (PEM electrolyzer) and predictions (aqueous KOH-based electrolyzer) are shown in FIG. 6. Aqueous KOH-based electrolyzers have a much stronger dependence of efficiency on temperature than PEM-based electrolyzers. For example, over the 23° C. temperature range shown in FIG. 6, the efficiency of the PEM electrolyzer increased by 5%, while that of the aqueous KOH-based electrolyzer increased by 67%.

One method of increasing the overall solar to hydrogen efficiency of the PV-electrolyzer combination is by utilizing the opposite temperature dependence of the PV electricity generation process and the water electrolysis hydrogen generation process.

Figure 7:
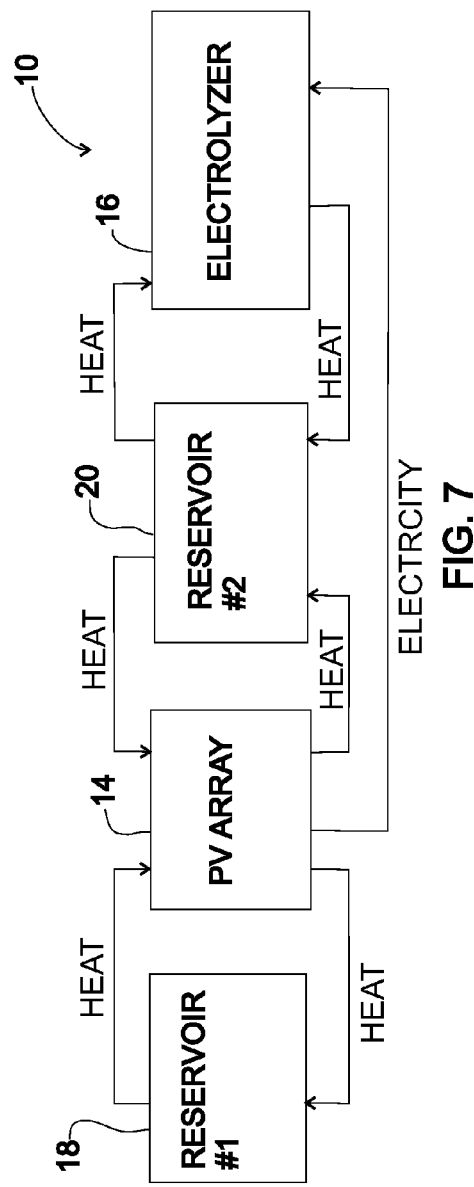
FIG. 7 is a block diagram of the thermal management of a solar (PV) array-electrolyzer system, according to one embodiment of the invention.
Figure 8:
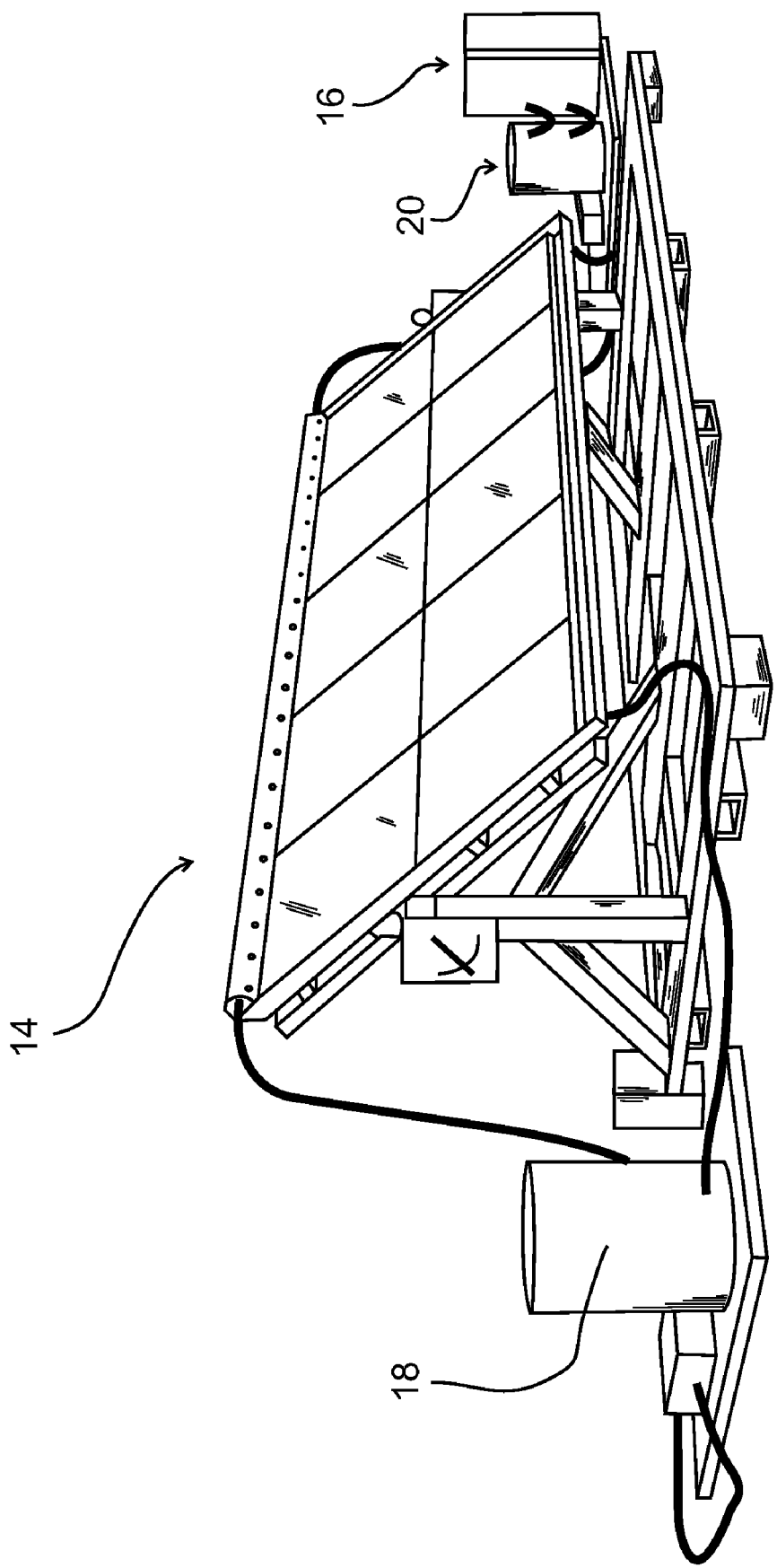
FIG. 8 is an artist's rendition of the block diagram from FIG. 7.

FIG. 7 is a block diagram of a process 10 for thermal management of a solar (PV) array-electrolyzer system. A PV array 14 is plumbed to an uninsulated first reservoir 18 and an insulated second reservoir 20 so that heat can be transferred between the PV array and the reservoirs using a fluid. The PV array 14 is electrically connected to an electrolyzer 16. The electrolyzer 16 is also plumbed to the insulated second reservoir 20. Electrical power is transmitted from the PV array 14 to the electrolyzer 16 using wires. FIG. 8 shows an artist's rendition of the block diagram in FIG. 7.

The PV array 14 illustrated in FIG. 7 may be any suitable PV array, utilizing modules from major PV module manufacturers such as Sanyo, Shell Solar, Sharp, and others. For example, most PV modules have temperature coefficients within the range of −0.2 to −0.6% of power per ° C. The illustration of the PV temperature effect on PV power output in FIG. 2 utilized the Sanyo HIP-190BA3 module (temperature coefficient=−0.3% power/° C.).

The electrolyzer 16 may be any suitable electrolyzer. The electrolyzer 16 may be a PEM electrolyzer including an anode, a cathode and a membrane in between. One example of a suitable electrolyzer is the HOGEN Model 40 Hydrogen Generator, available from Proton Energy Systems, Rocky Hill, Conn. The electrolyzer 16 may also be a high-pressure electrolyzer, for example, a high-pressure electrolyzer that uses an aqueous solution of KOH as the electrolyte, available from Avalence LLC, Milford, Conn.

According to one embodiment of the invention, solar heat may be collected at the PV array 14 and heat may be transferred from the PV array 14, where higher temperatures may exercise a negative effect, to the electrolyzer 16, where higher temperatures may be beneficial. The heat may be transferred from the PV array 14 to the electrolyzer 16 by a circulating fluid. The circulating fluid may be any suitable fluid, for example, water. The circulating fluid may be commercial water or it may even be stored rain water. The circulating fluid may also contain antifreeze fluid.

According to one embodiment of the invention, various operating modes are used to maintain the temperature of the PV array within the range of 15-30° C. (or less if ambient temperatures with the described liquid-based cooling system allows it, as lower temperatures will increase the PV efficiency) and to maintain the temperature of the electrolyzer within the range of 60-80° C. for a KOH based electrolyzer. The exact steady-state operating temperatures will depend on the electrolyzer characteristics, i.e., its ability to withstand high temperatures. The electrolyzer heating may be particularly advantageous in the morning when it will increase the electrolyzer efficiency relative to a cold electrolyzer, i.e., one without heating. One example of the operating modes is illustrated in Table 1. At the time of sunrise, the insulated second reservoir 20 is hot and the uninsulated first reservoir 18 is cold. At sunrise, both the PV array 14 and the electrolyzer 16 are cold. Just prior to sunrise, a pump may begin to circulate the fluid from the hot insulated second reservoir 20 to the electrolyzer so that the electrolyzer can efficiently produce hydrogen once the sun rises and the PV array 14 begins to produce electrical energy. The pumps may be small pumps such as the Little Giant PES-120-PW, available from Little Giant Pump Company, Oklahoma City, Okla.

TABLE 1

Operating modes for a solar array-electrolyzer system with thermal management.

| Mode | Time | Solar Array | Electrolyzer | Reservoir #1 | Reservoir #2 |
|---|---|---|---|---|---|
| 1 | Sunrise | Cold | Cold | Cold | Hot |
| 2 | 2-4 hours after sunrise | Hot | Hot | Cold/Warm | Warm |
| 3 | 2 hours before sunset | Hot | Hot | Hot | Hot |
| 4 | Sunset | Warm | Hot | Hot | Hot |
| 5 | Over night | Cold | Cold | Cold | Hot |
| 6 | Sunrise | Cold | Cold | Cold | Hot |

After the sun has been up for approximately 2 to 4 hours, the PV array 14 begins to heat up. The cold fluid from the uninsulated first reservoir 18 is circulated over the PV array 14 to cool it and is circulated back into the first reservoir 18. The fluid may be circulated over the PV array 14 by fluid sprayed or run over the front surface of the PV array 14. For this mode of heat transfer the fluid needs to be transparent, such as water. Alcohols commonly used in automotive antifreeze would also be transparent and could be used to prevent freezing of the water (the colorant used in commercial antifreeze would be left out). The fluid may also be circulated over the back of the PV array 14 through tubing in contact with the back of the PV array 14. In this case, the fluid would not need to be transparent. Once the uninsulated first reservoir 18 becomes hot, the fluid from the first reservoir 18 stops circulating over the PV array 14. Instead, fluid from the insulated second reservoir 20 is circulated over the PV array 14 and back into the second reservoir 20 so that the second reservoir 20 becomes hot. Once the insulated second reservoir 20 is hot, the circulation of fluid from the second reservoir 20 stops. The fluid in the second reservoir 20 remains hot due to insulation that may surround the same.

Beginning around sunset, the fluid from the uninsulated first reservoir 18 circulates over the PV array 14 in order to cool the fluid in the first reservoir 18 overnight. Fluid from the first reservoir 18 continues to be circulated over the cold PV array 14 overnight so that the fluid in the first reservoir 18 is cold by sunrise on the following morning. This process of fluid circulation is repeated day after day with the same basic cycle.

Figure 9:
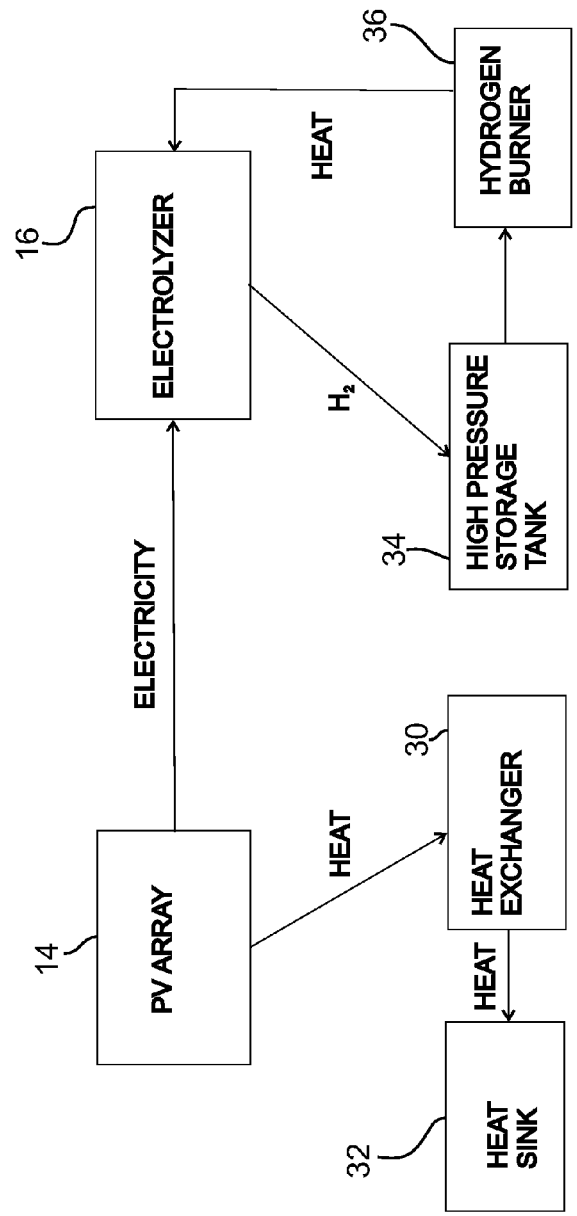
FIG. 9 is a block diagram of the thermal management of a solar (PV) array-electrolyzer system, according to one embodiment of the invention.

In another embodiment of the invention illustrated in FIG. 9, the PV array 14 is electrically connected to the electrolyzer 16. The PV array 14 is also plumbed to a heat exchanger 30 so that a fluid can be used for heat transfer. The heat exchanger 30 may be any suitable heat exchanger, for example an automobile radiator or similar device with copper or aluminum fins. The heat exchanger 30 is connected to a heat sink 32. Preferably, the heat sink is reliable and is at a temperature below 25° C. The heat sink 32 may be the earth, for example at a depth of approximately ten feet below the earth's surface. At a depth of ten feet below the earth's surface, the temperature may be around 10-15° C. year round. The heat sink may also be the earth at a depth approximately at or below the water table. A circulating fluid, for example a mixture of deionized water and antifreeze fluid, is circulated over the PV array and circulated to the heat exchanger 30. The fluid may be circulated by being pumped over the face of the PV array 14, or the fluid may be circulated over the back of the PV array 14 through tubing in contact with the back of the PV array 14. It may be unnecessary to circulate the fluid over the PV array when the weather is cold.

As illustrated in FIG. 9, the hydrogen produced in the electrolyzer 16 is routed from the electrolyzer to a high pressure (up to 6500 psi) storage tank 34. The storage tank 34 may be connected to a hydrogen burner 36, which may be installed in the electrolyzer chamber. The hydrogen gas is burned in the hydrogen burner 36 to heat the electrolyzer 16. Only a very small flow of hydrogen may be needed for warming the electrolyzer to 60° C., for example, even in cold weather, especially if the electrolysis cell chambers are insulated. The hydrogen produced by the electrolyzer 16 is renewably generated and non-polluting. The electrolyzer temperature may be controlled by a thermostat as in home water heaters. To initiate the heating of the electrolyzer 16, a switch may be activated when solar power from the PV array 14 is first generated in the morning or a timer may be set for sunrise. The heating of the electrolyzer 16 may be shut off by the thermostat when the temperature in the electrolyzer reaches a predetermined set point, for example, 60° C., or at the temperature corresponding to the optimal electrolyzer efficiency that does not compromise the electrolyzer durability. In one embodiment, during most of the period when hydrogen is produced by the electrolyzer 16, a hot steady-state operating temperature may be maintained in the electrolysis cells by the waste heat produced in the electrolysis reaction.

The above description of embodiments of the invention is merely exemplary in nature and, thus, variations thereof are not to be regarded as a departure from the spirit and scope of the invention.

What is claimed is:

1. A process comprising:
   transmitting electrical power produced by a PV array to an electrolyzer;

cooling the PV array by circulating a first fluid between a first storage reservoir and the PV array;

when the PV array rises above a first predetermined temperature, ending the circulation of the first fluid;

heating a second fluid by circulating the second fluid between a second storage reservoir and the PV array;

transferring heat from the second fluid in the second storage reservoir to the electrolyzer; and cooling the first fluid by circulating the first fluid stored in the first storage reservoir between the first storage reservoir and the PV array when the PV array falls below a second predetermined temperature.

2. The method of claim 1, further comprising circulating the first fluid through a heat exchanger or heat sink.

3. The method of claim 2, further comprising positioning the heat exchanger or heat sink in a subterranean location.

4. The method of claim 1, further comprising:
   delivering hydrogen from the electrolyzer to a hydrogen-burning heater; and
   heating the second fluid with the hydrogen-burning heater.

5. The method of claim 1, wherein at least one of the first fluid or second fluid comprises an antifreeze solution.

6. The method of claim 1, wherein the circulating of at least one of the first fluid or the second fluid is accomplished using a pump.

7. The method of claim 1, wherein the second reservoir further comprises an thermal insulating material.

* * * * *